US012591445B2

(12) United States Patent
Tsirkin

(10) Patent No.: US 12,591,445 B2
(45) Date of Patent: Mar. 31, 2026

(54) MIGRATING MEMORY PAGES BETWEEN NON-UNIFORM MEMORY ACCESS (NUMA) NODES BASED ON ENTRIES IN A PAGE MODIFICATION LOG

(71) Applicant: RED HAT, INC., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 754 days.

(21) Appl. No.: 17/973,819

(22) Filed: Oct. 26, 2022

(65) Prior Publication Data

US 2024/0143362 A1     May 2, 2024

(51) Int. Cl.
*G06F 9/455* (2018.01)

(52) U.S. Cl.
CPC ...... *G06F 9/45558* (2013.01); *G06F 9/45545* (2013.01); *G06F 2009/4557* (2013.01); *G06F 2009/45583* (2013.01)

(58) Field of Classification Search
CPC ....... G06F 9/45558; G06F 2009/45583; G06F 9/45
See application file for complete search history.

(56) References Cited

U.S. PATENT DOCUMENTS

| | | | |
|---|---|---|---|
| 8,838,935 B2 | 9/2014 | Hinton et al. | |
| 9,465,669 B2 | 10/2016 | Venkatasubramanian et al. | |
| 9,594,521 B2 | 3/2017 | Blagodurov et al. | |
| 9,665,724 B2 * | 5/2017 | McKeen ................. | G06F 12/14 |
| 10,613,990 B2 | 4/2020 | Arcangeli et al. | |
| 10,776,151 B2 | 9/2020 | Kim et al. | |

| | | | |
|---|---|---|---|
| 11,113,094 B1 * | 9/2021 | Koryakin .............. | G06F 9/4843 |
| 11,483,205 B1 * | 10/2022 | Jain ........................ | G06F 9/5061 |
| 12,050,798 B2 * | 7/2024 | Williams .............. | G06F 3/0665 |
| 2010/0250868 A1 * | 9/2010 | Oshins .................. | G06F 9/5016 718/1 |
| 2012/0011504 A1 * | 1/2012 | Ahmad ................... | G06F 12/08 718/1 |

(Continued)

FOREIGN PATENT DOCUMENTS

CN          106354543 B      11/2019

OTHER PUBLICATIONS

Lim et al., "User-Level Memory Scheduler for Optimizing Application Performance in NUMA-Based Multicore Systems", https://www.researchgate.net/publication/287320046_User-level_memory_scheduler_for_optimizing_application_performance_in_NUMA-based_multicore_systems, 2014; pp. 240-243.

(Continued)

*Primary Examiner* — Lewis A Bullock, Jr.
*Assistant Examiner* — Christian M Bakhit
(74) *Attorney, Agent, or Firm* — Kilpatrick Townsend & Stockton LLP

(57)          ABSTRACT

Memory pages can be migrated between non-uniform memory access (NUMA) nodes based on entries in a page modification log according to some examples described herein. In one example, a physical processor can detect a request from a virtual machine to access a memory page. The physical processor can then update a page modification log to include an entry indicating the request. A hypervisor supporting the virtual machine can be configured to detect the request based on the entry in the page modification log and, in response to detecting the request, migrate the memory page from a second NUMA node to a destination NUMA node.

20 Claims, 7 Drawing Sheets

302
A physical processor detects a request from a virtual machine to access a memory page 304
The physical processor updates a page modification log to include an entry indicating the request 306
A hypervisor detects the request based on the entry in the page modification log 308
The hypervisor migrates the memory page to a destination NUMA node

(56) References Cited

U.S. PATENT DOCUMENTS

| | | | | |
|---|---|---|---|---|
| 2019/0171577 A1* | 6/2019 | Arcangeli | ........... | G06F 12/1036 |
| 2020/0117612 A1* | 4/2020 | Gandhi | ................. | G06F 16/907 |
| 2021/0157647 A1* | 5/2021 | Wen | ....................... | G06F 9/5016 |
| 2021/0240616 A1* | 8/2021 | Stabrawa | ............ | G06F 21/6218 |
| 2021/0263760 A1* | 8/2021 | Tsirkin | .................. | G06F 12/109 |
| 2021/0303481 A1* | 9/2021 | Ray | ......................... | G06N 3/045 |
| 2021/0326253 A1* | 10/2021 | Bak | ..................... | G06F 12/0646 |
| 2023/0004302 A1* | 1/2023 | Reza | .................... | G06F 3/0647 |
| 2023/0298128 A1* | 9/2023 | Puffer | ...................... | G06T 1/60 |
| | | | | 345/520 |
| 2024/0248633 A1* | 7/2024 | Guim Bernat | ........ | G06F 3/0683 |

OTHER PUBLICATIONS

Wu et al., "vProbe: Scheduling Virtual Machines on NUMA Systems", https://ieeexplore.ieee.org/abstract/document/7776480, 2016; pp. 70-79.

* cited by examiner

302
A physical processor detects a request from a virtual machine to access a memory page 304
The physical processor updates a page modification log to include an entry indicating the request 306
A hypervisor detects the request based on the entry in the page modification log 308
The hypervisor migrates the memory page to a destination NUMA node

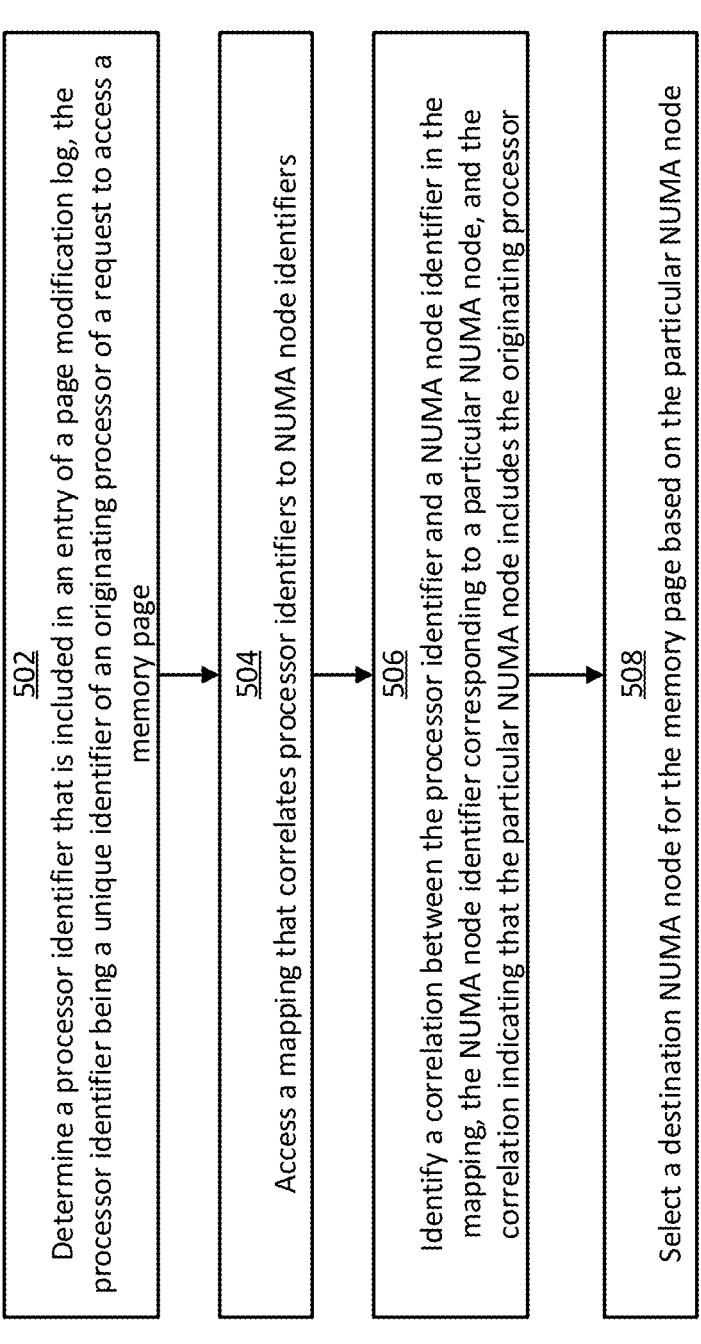

502

Determine a processor identifier that is included in an entry of a page modification log, the processor identifier being a unique identifier of an originating processor of a request to access a memory page

504

Access a mapping that correlates processor identifiers to NUMA node identifiers

506

Identify a correlation between the processor identifier and a NUMA node identifier in the mapping, the NUMA node identifier corresponding to a particular NUMA node, and the correlation indicating that the particular NUMA node includes the originating processor

508

Select a destination NUMA node for the memory page based on the particular NUMA node

FIG. 5

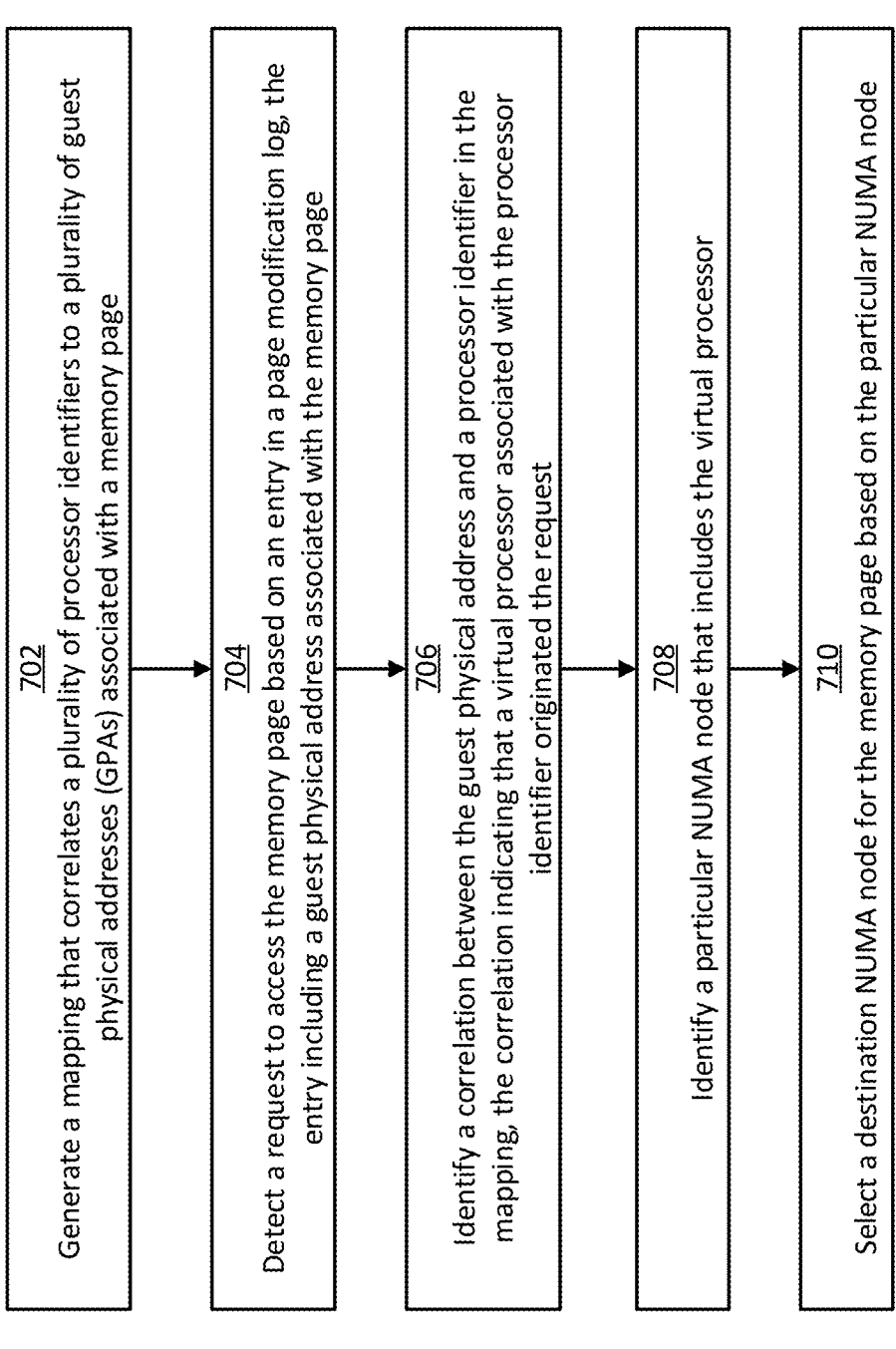

702 Generate a mapping that correlates a plurality of processor identifiers to a plurality of guest physical addresses (GPAs) associated with a memory page 704 Detect a request to access the memory page based on an entry in a page modification log, the entry including a guest physical address associated with the memory page 706 Identify a correlation between the guest physical address and a processor identifier in the mapping, the correlation indicating that a virtual processor associated with the processor identifier originated the request 708 Identify a particular NUMA node that includes the virtual processor 710 Select a destination NUMA node for the memory page based on the particular NUMA node

FIG. 7

MIGRATING MEMORY PAGES BETWEEN NON-UNIFORM MEMORY ACCESS (NUMA) NODES BASED ON ENTRIES IN A PAGE MODIFICATION LOG

TECHNICAL FIELD

The present disclosure relates generally to management of non-uniform memory access (NUMA) nodes. More specifically, but not by way of limitation, this disclosure relates to migrating memory pages between NUMA nodes based on entries in a page modification log.

BACKGROUND

A non-uniform memory access (NUMA) architecture can include multiple nodes that are linked through high-speed interconnects. Each node is a physical computer that can include one or more physical processors (e.g., a multi-core CPU), a physical memory, and a memory controller. Since these nodes are part of a NUMA system, they can be referred to as NUMA nodes. The general idea behind NUMA systems is that each NUMA node should ideally contain the information most needed by the processors of that NUMA node. That way, the most needed information will be "local" to the NUMA node and can be accessed faster, using an internal bus of the NUMA node. Information stored in other NUMA nodes is considered "remote". Remote information can still be accessed, but more slowly. As a result, it can be important to optimally position information in the NUMA system. In particular, it can be desirable to properly position information in the NUMA system to minimize the number of remote accesses by each physical processor, which can reduce latency and avoid other performance problems.

Some NUMA nodes can execute virtual machines. A virtual machine (VM) typically includes virtualized hardware and guest software. The virtualized hardware can emulate physical computer hardware. Examples of the virtualized hardware can include virtual central processing units (vCPUs), virtual random access memory (vRAM), virtual network interfaces, and virtual storage. The guest software can be any software programs that execute on top of the virtual machine. Guest software is generally given limited access to the physical resources of the underlying host machine.

Virtual machines can be deployed on a host machine (e.g., a NUMA node) using a hypervisor. A hypervisor can be a software layer that sits below the virtual machines and above the physical hardware of the host machine. In some cases, the hypervisor can execute on top of an operating system running on the host machine. In other cases, the hypervisor can execute directly on the physical hardware without an operating system beneath it. Either way, the hypervisor can provide interfaces between the virtual machines and the underlying physical hardware of the host machine.

BRIEF DESCRIPTION OF THE DRAWINGS

FIG. 5 is a flowchart of an example of a process for using a processor-to-node mapping to implement some aspects of the present disclosure.

FIG. 7 is a flowchart of an example of a process for using a processor-to-GPA mapping to implement some aspects of the present disclosure.

DETAILED DESCRIPTION

Figure 1:
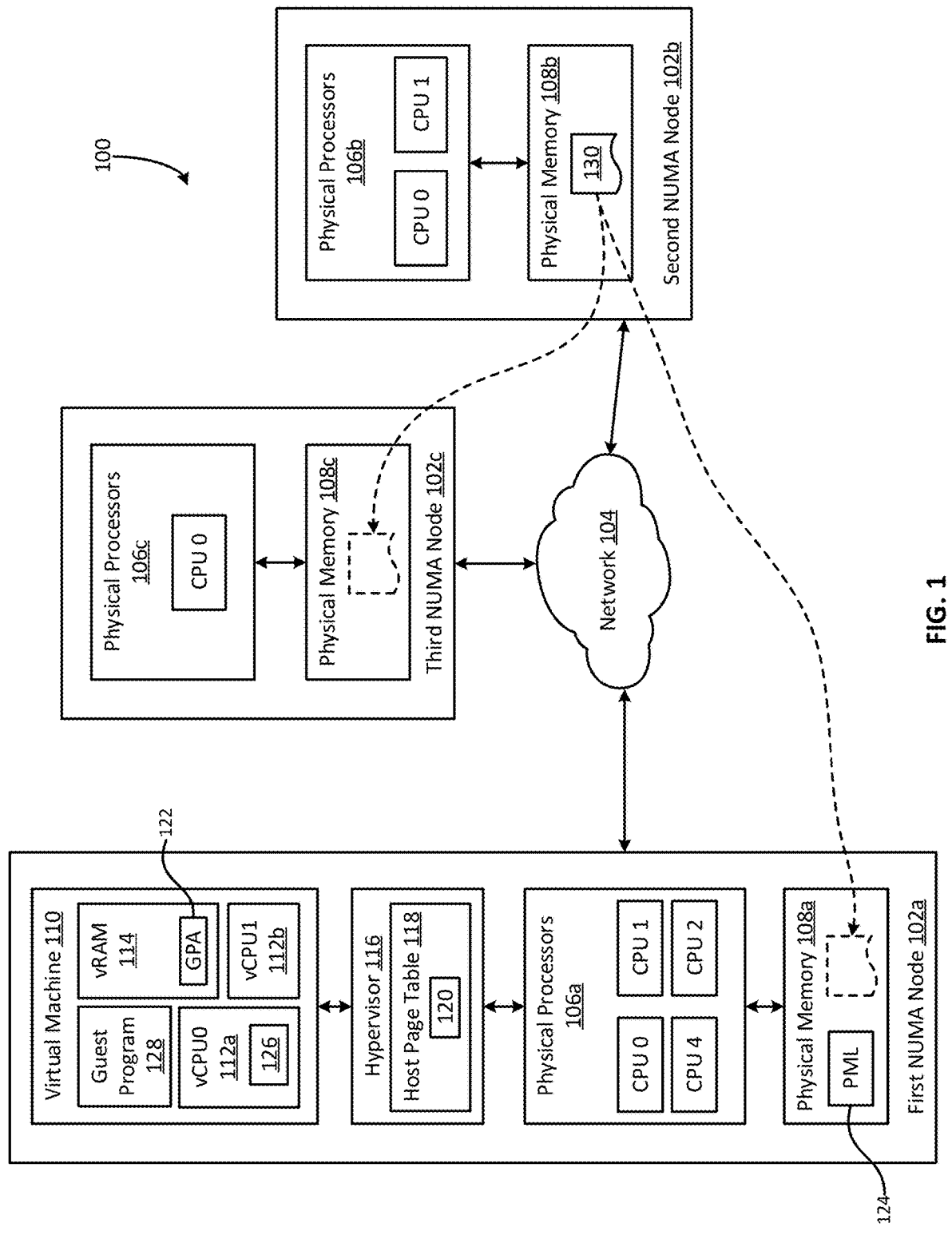
FIG. 1 is a block diagram of an example of a system for migrating memory pages between NUMA nodes based on entries in a page modification log according to some aspects of the present disclosure.

A non-uniform memory access (NUMA) system can include multiple NUMA nodes linked to one another via high-speed interconnects. At least one of the NUMA nodes can execute a virtual machine (VM). The virtual machine can include guest software running in a guest context. The guest context can be a reduced-privilege execution mode. The guest software can execute by default in the guest context to allow the hypervisor to retain control over the physical resources of the computer system.

While running, the guest software can transmit a request to access a memory page. When the guest software issues a read request, the underlying physical processor may trap a page fault. The page fault, in turn, can interrupt the running virtual machine. The interrupt may induce a transition from the guest context to another context with a higher privilege level for handling the interrupt. The transition from the guest context to the other context can be referred to as a VM exit. One example of the other context can be a hypervisor context. A hypervisor context can be a privileged execution mode in which the hypervisor performs tasks associated with the interrupt. The hypervisor context can have a higher privilege level than the guest context. In certain processor architectures, the guest context may be referred to as a virtual machine extension (VMX) non-root execution mode and the hypervisor context may be referred to as a privileged VMX root execution mode. When a VM exit causes a transition from the guest context to the hypervisor context, the hypervisor can temporarily pause the virtual machine while the interrupt is being handled (e.g., to obtain the requested memory page). The hypervisor can then resume the virtual machine once the interrupt is complete. But, switching between execution contexts in this way can create overhead because it consumes time and computing resources. I/O intensive applications are particularly susceptible to this overhead, because they can generate a large number of access requests that result in a large number of page faults and VM exits. The page faults and VM exits can induce a significant amount of undesirable overhead in the system.

Some examples of the present disclosure can overcome one or more of the abovementioned problems by using a page modification log to avoid triggering the page faults and VM exits described above. For example, a NUMA node can execute a virtual machine on a physical processor. A hypervisor can be used to run the virtual machine on the physical processor. The physical processor can detect a request to access a memory page from the virtual machine (e.g., its guest software). In response to detecting the request, the physical processor can update a page modification log to include an entry indicating the request. The page modification log can be a data log stored in a physical memory of the NUMA node. Based on the entry in the page modification log, the hypervisor can detect the request. For example, the hypervisor can monitor the page notification log and determine that the entry has been added to the page modification log. Using these techniques, the hypervisor can detect the request without the underlying physical processor trapping a page fault or triggering a VM exit.

After detecting the request to access the memory page, the hypervisor can perform one or more operations to handle the request. For example, the hypervisor may perform migration operations to migrate the requested memory page from its current location (its current NUMA node) to a destination NUMA node. The destination NUMA node may be any suitable NUMA node. After the memory page is migrated to the destination NUMA node, the hypervisor may obtain the memory page from the destination NUMA node and provide it to the virtual machine for usage.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for migrating memory pages between NUMA nodes based on entries in a page modification log according to some aspects of the present disclosure. In some examples, the system 100 may be a cloud computing environment, a computing cluster, or another type of distributed computing system. The system 100 may include any number of NUMA nodes, though in this example the system 100 includes three NUMA nodes 102a-c. The NUMA nodes 102a-c can be in communication with one another via one or more networks 104, such as a local area network or the Internet. Each of the NUMA nodes 102a-c can include one or more physical processors and one or more physical memories. For example, NUMA node 102a can include physical processors 106a and physical memory 108a. NUMA node 102b can include physical processors 106b and physical memory 108b. NUMA node 102c include physical processors 106c and physical memory 108c. Examples of the physical processors may be central processing units (CPUs) and examples of the physical memories may be hard drives.

As shown in FIG. 1, the NUMA node 102a can execute a virtual machine 110. The virtual machine 110 can include one or more virtual processors 112a-b, such as vCPUs. The virtual machine 110 can also include a virtual memory 114, such as vRAM. In this context, the virtual machine 110 may be considered a "guest" running on the first NUMA node 102a, which can be considered the "host". Thus, the virtual processors 112a-b may also be referred to as guest processors and the virtual memory may also be referred to as a guest memory. The virtual machine 110 can be supported by a hypervisor 116, which can execute on one or more of the physical processors 106a. For example, the hypervisor 116 can assist in the deployment and management of the virtual machine 110.

At various points in time, the virtual machine 110 may request access to memory pages. For example, a virtual processor 112a of the virtual machine 110 may execute a software program, which can be referred to as a guest program 128. The guest program 128 may need to access a memory page 130, for example to read the memory page 130. The memory page 130 may be physically stored in the physical memory 108a of the first NUMA node 102a or in a physical memory of another NUMA node, such as the second NUMA node 102b. When the guest program 128 wants to access the memory page 130, the underlying virtual processor 112a may issue a request 126 for the memory page 130. The request 126 can include a guest physical address (GPA) 122 associated with the memory page 130 in the virtual memory 114. In particular, the guest physical address 122 can be a memory address within guest memory 114 that points to the memory page 130.

Because the virtual machine 110 is executing on the physical processors 106a, the physical processors 106a can detect the request 126 to access the memory page 130. In response to detecting the request 126, the physical processors 106a can update a page modification log (PML) 124 to include an entry associated with the request 126. For example, CPU0 on the first NUMA node 102a can detect the request 126 and responsively add an entry to the page modification log 124 to indicate the request 126. The entry may include the guest physical address 122. The page modification log 124 can be a log that is maintained by the physical processors 106a. The page modification log 124 can be stored in the physical memory 108a of the first NUMA node 102a, such as RAM of the first NUMA node 102a.

In some examples, the hypervisor 116 can monitor the page modification log 124 for changes to detect the new entry in the page modification log 124. Alternatively, the physical processor 106a can notify the hypervisor 116 of the new entry in the page modification log 124. For example, the physical processor 106a can transmit an interrupt to the hypervisor 116, where the interrupt is associated with the request 126. The interrupt can include some or all of the data in the new entry in the page modification log 124. Either way, the hypervisor 116 can detect the request 126. In response to detecting the request 126, the hypervisor 116 can execute operations for handling the request 126. In this way, the hypervisor 116 can detect and handle the request 126, without the physical processor 106a triggering an exit of the virtual machine 110. This can reduce the overhead associated with handling such requests 126.

In some examples, the operations executed by the hypervisor 116 may include determining whether the requested memory page 130 is stored locally within the physical memory 108a of the first NUMA node 102a. If so, the hypervisor 116 can obtain the requested memory page 130 from the physical memory 108a and provide it to the virtual processor 112a that originated the request 126. If the requested memory page 130 is not stored locally within the physical memory 108a of the first NUMA node 102a, then the hypervisor 116 may perform additional operations. For example, the hypervisor 116 can determine whether the requested memory page 130 is stored on the closest NUMA node to the first NUMA node 102a. The closest NUMA node can be whichever NUMA node in the system 100 has the closest physical proximity to the first NUMA node 102a. Storing memory pages on NUMA nodes that are in the closest physical proximity to the requesting NUMA nodes can reduce latency and improve the responsiveness of the system 100. If the hypervisor 116 determines that the requested memory page 130 is stored on the closest NUMA node, then the hypervisor 116 may obtain the requested memory page 130 from the closest NUMA node and provide it to the virtual processor 112a that originated the request 126.

In some examples, the hypervisor 116 may perform migration operations to migrate the requested memory page

130 from its current location (its current NUMA node) to a destination NUMA node. The destination NUMA node may be any suitable NUMA node, such as the first NUMA node 102a or the closest NUMA node. Two examples of such migrations are shown in FIG. 1. In the first example, the memory page 130 is migrated from the second NUMA node 102b to the third NUMA node 102c. The third NUMA node 102c may have been selected as the destination for the migration because it is located physically closer to the first NUMA node 102a than the second NUMA node 102b. This migration is represented by a first dashed arrow in FIG. 1. In the second example, the memory page 130 is migrated from the second NUMA node 102b to the first NUMA node 102a. This migration is represented by a second dashed arrow in FIG. 1. After the memory page 130 is migrated to the destination NUMA node, the hypervisor 116 may obtain the memory page 130 from the destination NUMA node and provide it to the virtual processor 112a that originated the request 126.

Migrating the memory page 130 from its current location (e.g., the second NUMA node 102b) to the destination NUMA node may involve the following steps. The hypervisor 116 can first determine a NUMA node on which the memory page 130 is currently stored. This location can be referred to as the source NUMA node. The hypervisor 116 can also determine that the memory page 130 exists at a particular memory address within the physical memory 108b of the source NUMA node. The particular memory address can be referred to as the source memory address. The hypervisor 116 can then determine a destination NUMA node to which to migrate the memory page 130. For example, the hypervisor 116 can determine the destination NUMA node based on the physical distance between the destination NUMA node and the requesting NUMA node (e.g., the first NUMA node 102a). After determining the destination NUMA node, the hypervisor 116 can copy the memory page from the source memory address to a destination memory address within a physical memory of the destination NUMA node. This may involve the hypervisor 116 transmitting one or more commands to the source NUMA node and/or the destination NUMA node to coordinate the migration. In some examples, the hypervisor 116 can further generate a page table entry 120, within a host page table 118 of the hypervisor 116, that maps the guest physical address 122 of the memory page 130 to the destination memory address on the destination NUMA node. Generating the page table entry 120 can involve creating a new entry in the host page table 118 that correlates the guest physical address 122 associated with the memory page 130 to the destination memory address on the destination NUMA node. Alternatively, generating the page table entry 120 can involve updating an existing entry in the host page table 118 to correlate the guest physical address 122 associated with the memory page 130 to the destination memory address on the destination NUMA node.

It will be appreciated that although FIG. 1 shows a certain number and arrangement of components, this is intended to be illustrative and non-limiting. Other examples may involve more components, fewer components, different components, or a different configuration of components than is shown in FIG. 1. For instance, similar principles can be applied using other types of computing nodes (e.g., other than NUMA nodes) outside the NUMA context.

Figure 2:
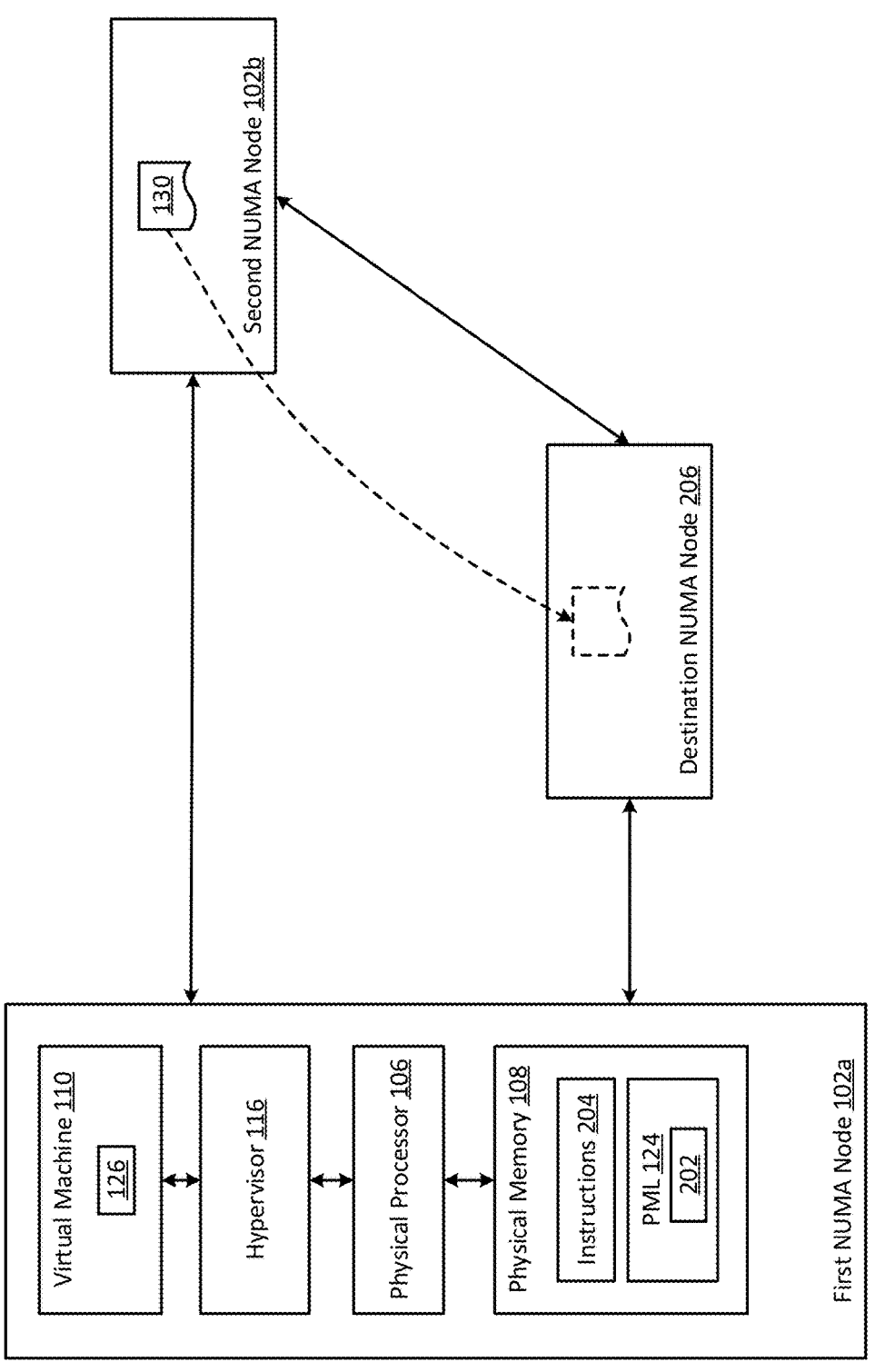
FIG. 2 is a block diagram of an example of a system for migrating a memory page between NUMA nodes according to some aspects of the present disclosure.

FIG. 2 is a block diagram of another example of a system for migrating a memory page between NUMA nodes according to some aspects of the present disclosure. The system includes a first NUMA node 102a comprising a physical processor 106 communicatively coupled to a physical memory 108.

The physical processor 106 can include one processing device or multiple processing devices. Examples of the physical processor 106 include a Field-Programmable Gate Array (FPGA), an application-specific integrated circuit (ASIC), or a microprocessor. The physical processor 106 can execute instructions 204 stored in the physical memory 108 to perform operations. The instructions 204 may include processor-specific instructions generated by a compiler or an interpreter from code written in any suitable computer-programming language, such as C, C++, C#, and Java.

The physical memory 108 can include one memory device or multiple memory devices. The physical memory 108 can be volatile or non-volatile (it can retain stored information when powered off). Examples of the physical memory 108 include electrically erasable and programmable read-only memory (EEPROM), flash memory, or any other type of non-volatile memory. At least some of the physical memory 108 can include a non-transitory computer-readable medium from which the physical processor 106 can read instructions 204. A computer-readable medium can include electronic, optical, magnetic, or other storage devices capable of providing the physical processor 106 with computer-readable instructions or other program code. Examples of a computer-readable medium include magnetic disks, memory chips, ROM, random-access memory RAM, an ASIC, a configured processor, optical storage, or any other medium from which a computer processor can read the instructions 204.

The physical processor 106 can execute a virtual machine 110, which can be supported by a hypervisor 116. The hypervisor 116 and the physical processor 106 may be configured to perform various functionality described herein, for example to avoid triggering a VM exit when the virtual machine 110 requests a memory page. For example, the physical processor 106 can detect a request 126 from the virtual machine 110 to access a memory page 130. In response to detecting the request 126, the physical processor 106 can update a page modification log 124 to include an entry 202 indicating the request 126. The hypervisor 116 can then detect the request 126 based on the entry 202 in the page modification log 124. In response to detecting the request 126, the hypervisor 116 can migrate the memory page 130 from a second NUMA node 102b to a destination NUMA node 206. The destination NUMA node 206 may be the first NUMA node 102a or a third NUMA node. To migrate the memory page 130 from the second NUMA node 102b to the destination NUMA node 206, the hypervisor 116 may transmit one or more commands to the second NUMA node 102b and/or the destination NUMA node 206, where the one or more commands are configured to initiate or coordinate the migration process.

Figure 3:
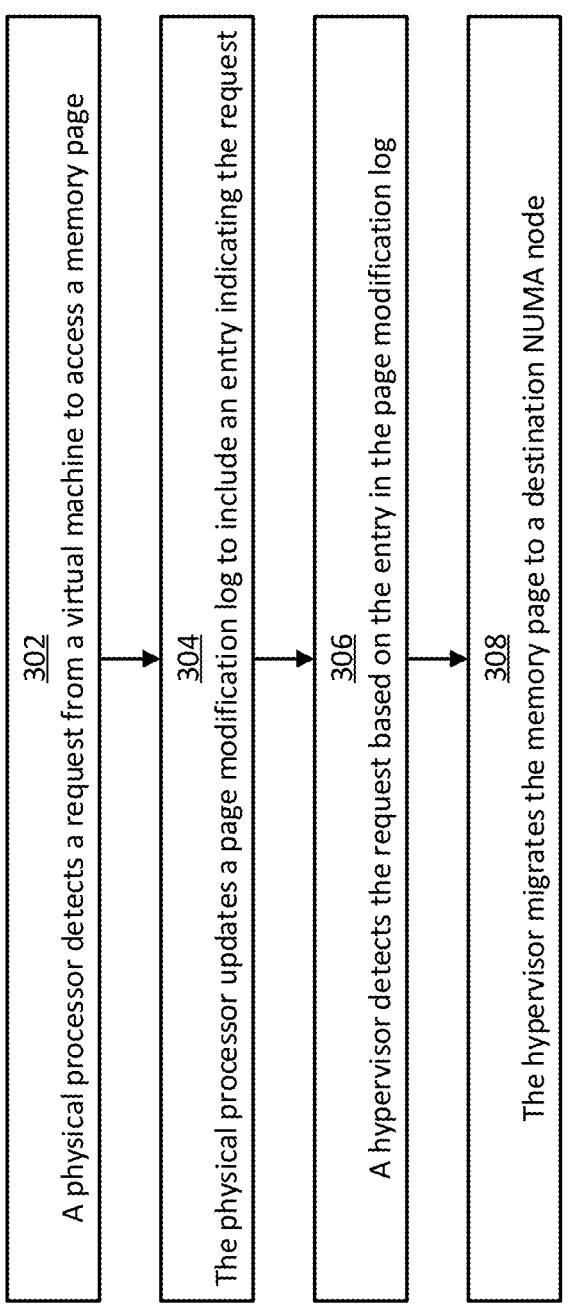
FIG. 3 is a flowchart of an example of a process for migrating a memory page between NUMA nodes according to some aspects of the present disclosure.

FIG. 3 is a flowchart of an example of a process for migrating a memory page between NUMA nodes according to some aspects of the present disclosure. Other examples may involve more operations, fewer operations, different operations, or a different order of operations than is shown in FIG. 3. The operations of FIG. 3 are described below with reference to the components of FIG. 2 above.

In block 302, a physical processor 106 detects a request 126 from the virtual machine 110 to access a memory page 130. For example, the physical processor 106 can determine that a virtual machine process executing on the physical processor 106 has generated the request 126.

In block 304, the physical processor 106 updates a page modification log 124 to include an entry 202 indicating the request 126, in response to detecting the request 126. For example, the physical processor 106 can append the entry 202 to the end of the page modification log 124.

In block 306, a hypervisor 116 detects the request 126 based on the entry 202 in the page modification log 124. For example, the hypervisor 116 can monitor the page modification log 124 for changes and detect the addition of the new entry 202 associated with the request 126.

In block 308, the hypervisor 116 migrates the memory page 130 from a second NUMA node 102b to a destination NUMA node 206, in response to detecting the request 126. For example, the hypervisor 116 can trigger the migration of the memory page 130, for example by transmitting one or more commands to the second NUMA node 102b and/or the destination NUMA node 206, where the commands are configured to initiate the migration process.

Figure 4:
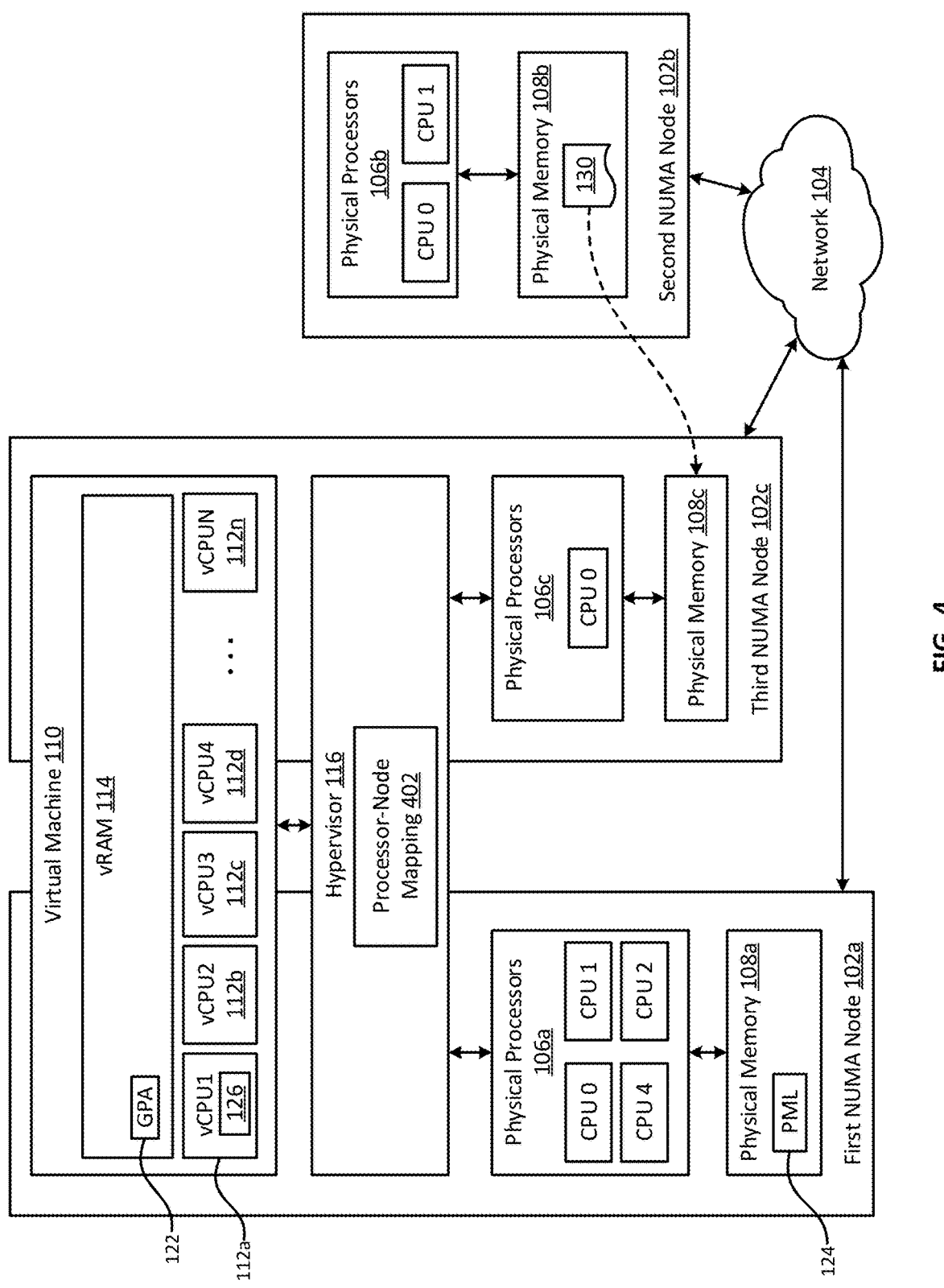
FIG. 4 is a block diagram of an example of a system for using a processor-to-node mapping to implement some aspects of the present disclosure.

FIG. 4 is a block diagram of an example of a system for using a processor-to-node mapping 402 to implement some aspects of the present disclosure. In this example, the system can include a virtual machine 110 that spans multiple NUMA nodes 102a, 102c. For example, the virtual machine 110 can include multiple virtual processors 112a-n that are executing on multiple physical processors 106a, 106c of multiple NUMA nodes 102a, 102c. This can make it challenging to determine which NUMA node issued a request 126 for a memory page 130. As a result, it can be challenging to determine whether or how to migrate the memory page 130.

To help overcome the abovementioned challenges, in some examples the hypervisor 116 can have access to a processor-to-node mapping 402. The mapping 402 can correlate processor identifiers to NUMA node identifiers. A processor identifier is a unique identifier of a physical processor or a virtual processor. A NUMA node identifier is a unique identifier of a NUMA node in the system. The mapping 402 can indicate which NUMA node contains each virtual processor and/or physical processor. For example, vCPU1 can be assigned the processor identifier "340561". And, the first NUMA node 102a can be assigned the NUMA node identifier "1". The mapping 402 may therefore correlate "340561" to "1," which can indicate that vCPU1 is located on the first NUMA node 102a. The mapping 402 may be maintained by the hypervisor 116 or another component of the system.

The mapping 402 can be used as follows. When the virtual machine 110 requests access to a memory page 130, one of the physical processors 106a, 106c can detect the request 126. For example, physical processor 106a can detect the request 126. The physical processor that detected the request 126 can then update the page modification log 124 to include an entry associated with the request 126. As mentioned earlier, the entry may include the guest physical address 122 associated with the request 126. But because the guest physical address 122 may not indicate which processor originated the request 126, the physical processor can also include a processor identifier in the entry, where the processor identifier uniquely identifies the originating processor of the request 126. Next, the hypervisor 116 can detect the request 126 (e.g., based on the entry in the page modification log 124) and determine the processor identifier associated with the request 126 (e.g., by extracting the processor identifier from the entry). By using the mapping 402 to correlate the processor identifier to a NUMA node, the hypervisor 116 can determine which of the NUMA nodes includes the originating processor of the request 126. For example, the hypervisor 116 can determine that the first NUMA node 102a includes the virtual processor 122a that issued the request 126.

In some examples, the hypervisor 116 can determine how to handle the request 126 based on the particular NUMA node that issued the request 126. For example, the hypervisor 116 can determine whether or how to migrate the memory page 130 based on the particular NUMA node that issued the request 126. For instance, the hypervisor 116 can select a destination NUMA node to which to migrate the memory page 130 based on the particular NUMA node that issued the request 126. In the example shown in FIG. 4, the first NUMA node 102a issued the request 126. So, the hypervisor 116 can select the third NUMA node 102c as a migration destination for the memory page 130, because the third NUMA node 102c is physically closer to the first NUMA node 102a than the second NUMA node 102b. The hypervisor 116 can then initiate the migration process, which is represented by a dashed arrow in FIG. 4. Migrating the memory page 130 to the physically closer NUMA node can reduce latency associated with the virtual machine 110 accessing the memory page 130.

FIG. 5 is a flowchart of an example of a process for using a processor-to-node mapping 402 to implement some aspects of the present disclosure. Other examples may involve more operations, fewer operations, different operations, or a different order of operations than is shown in FIG. 5. The operations of FIG. 5 are described below with reference to the components of FIG. 4 above.

In block 502, the hypervisor 116 determines a processor identifier that is included in an entry of a page modification log 124. The processor identifier is a unique identifier of an originating processor of a request 126 to access a memory page 130. The originating processor may be a virtual processor or a physical processor. In some examples, the hypervisor 116 may determine the processor identifier by extracting it from the entry or by receiving it in a notification from a physical processor.

In block 504, the hypervisor 116 accesses a mapping 402 that correlates processor identifiers to NUMA node identifiers. Each processor identifier can uniquely identify a processor (e.g., a virtual processor or a physical processor) and can be correlated in the mapping 402 to a NUMA node identifier. The NUMA node identifier can uniquely identify the NUMA node on which the processor resides.

The mapping 402 can be stored in any suitable location that is accessible to the hypervisor 116. The location may be internal or external to the NUMA node(s) executing the virtual machine 110. For example, the location may be the physical memory 108a of the first NUMA node 102a. Alternatively, the location can be a database that is separate from the NUMA nodes 102a-c and accessible to the hypervisor 116 via one or more network connections.

In block 506, the hypervisor 116 identifies a correlation between the processor identifier and a NUMA node identifier in the mapping 402, where the NUMA node identifier corresponds to a particular NUMA node. The correlation can indicate that the particular NUMA node includes the originating processor. For example, the NUMA node identifier can correspond to the first NUMA node 102a. In some such examples, the correlation in the mapping 402 can indicate that the first NUMA node 102a includes the originating processor, which may for example be the virtual processor 112a.

In block 508, the hypervisor 116 selects a destination NUMA node for the memory page (e.g., to which to migrate the memory page 130) based on the particular NUMA node that includes the originating processor. For example, the hypervisor 116 can select whichever NUMA node is physically closest to the originating processor as the destination NUMA node for the migration.

Figure 6:
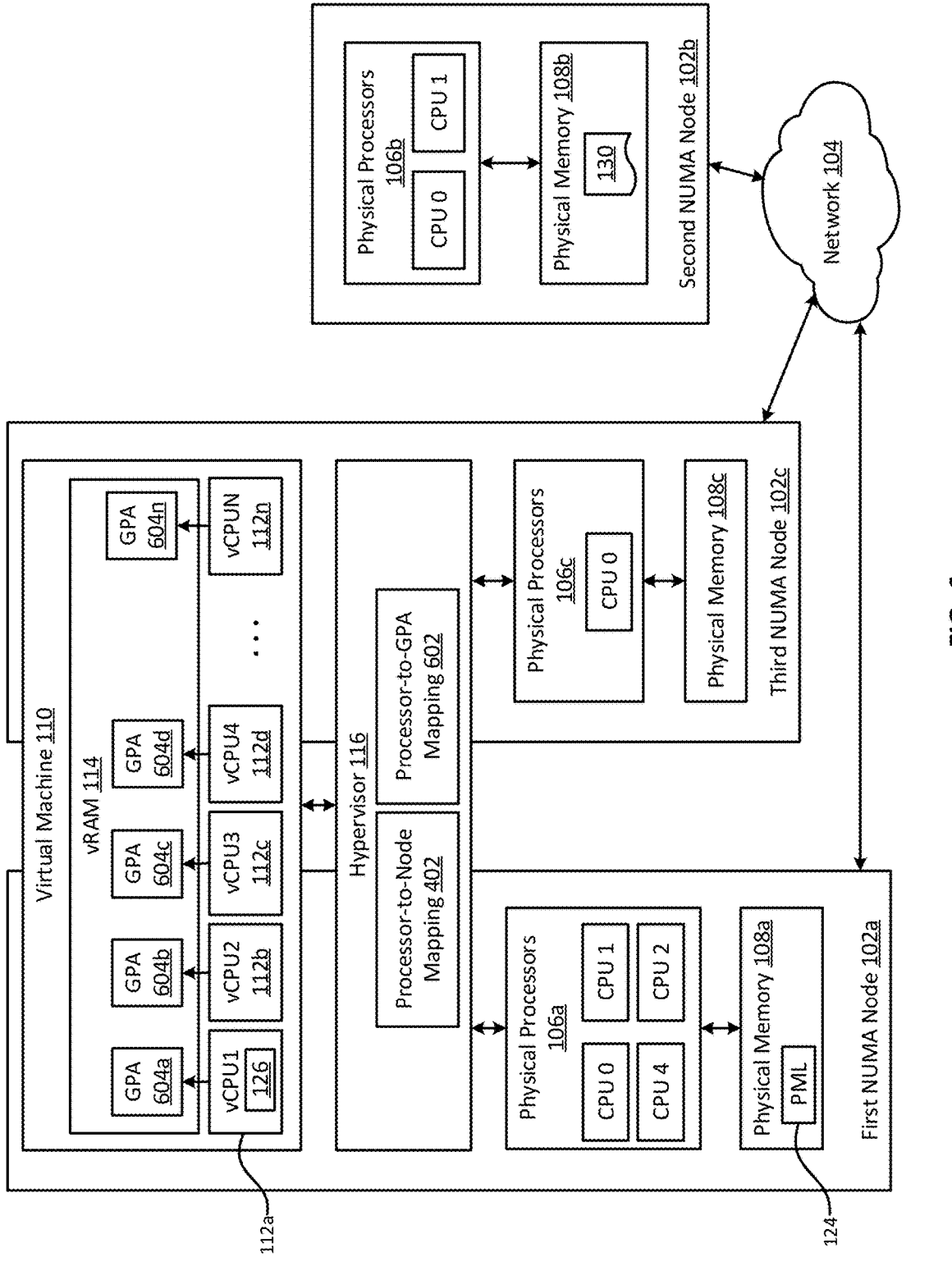
FIG. 6 is a block diagram of an example of a system for using a processor-to-GPA mapping to implement some aspects of the present disclosure.

FIG. 6 is a block diagram of an example of a system for using a processor-to-GPA mapping 602 to implement some aspects of the present disclosure. In this example, the system can include a virtual machine 110 that spans multiple NUMA nodes 102a, 102c. For example, the virtual machine 110 can include multiple virtual processors 112a-n that are executing on multiple physical processors 106a, 106c of multiple NUMA nodes 102a, 102c. This can make it challenging to determine which NUMA node issued a request 126 for a memory page 130. As a result, it can be challenging to determine whether or how to migrate the memory page 130.

To help overcome the abovementioned challenges, in some examples the hypervisor 116 can have access to a processor-to-node mapping 402, as described above. The hypervisor 116 can also have access to a processor-to-GPA mapping 602. The mapping 602 can correlate processor identifiers to multiple guest physical addresses (GPAs) associated with the memory page 130. More specifically, each virtual processor 112a-n can map the same memory page 130 to different guest physical addresses 604a-n of the virtual memory 114. For example, virtual processor 112a can map the memory page 130 to guest physical address 604a, virtual processor 112b can map the memory page 130 to guest physical address 604b, virtual processor 112c can map the memory page 130 to guest physical address 604c, and so on. Those guest physical addresses 604a-n, which all correspond to the same memory page 130, can then be mapped to their corresponding virtual processors in the processor-to-GPA mapping 602. For example, the guest physical addresses 604a-n can be correlated in the mapping 602 to the processor identifiers of the corresponding virtual processors 112a-n.

The mapping 602 can be used as follows. When a virtual processor 112a requests access to a memory page 130, one of the physical processors 106a, 106c can detect the request 126. For example, physical processor 106a can detect the request 126. The physical processor that detected the request 126 can then update the page modification log 124 to include an entry associated with the request 126. As mentioned earlier, the entry may include the guest physical address 604a associated with the request 126. Next, the hypervisor 116 can detect the request 126 (e.g., based on the entry in the page modification log 124) and determine the guest physical address 604a associated with the request 126 (e.g., by extracting the guest physical address 604a from the entry). The hypervisor 116 can then use the mapping 602 to determine a processor identifier that corresponds to the guest physical address 604a, where the processor identifier uniquely identifies the virtual processor 112a that issued the request 126.

Having determined the processor identifier associated with the request 126, the hypervisor 116 can next use the mapping 402 to determine which NUMA node issued the request 126. For example, the hypervisor 116 can determine that the first NUMA node 102a includes the virtual processor 122a that issued the request 126. The hypervisor 116 can then determine how to handle the request 126, for example using any of the techniques described above.

FIG. 7 is a flowchart of an example of a process for using a processor-to-GPA mapping to implement some aspects of the present disclosure. Other examples may involve more operations, fewer operations, different operations, or a different order of operations than is shown in FIG. 7. The operations of FIG. 7 are described below with reference to the components of FIG. 6 above.

In block 702, the hypervisor 116 generates a mapping 602 that correlates a plurality of processor identifiers to a plurality of guest physical addresses (GPAs) 604a-n associated with a memory page 130. Each processor identifier can uniquely identify a virtual processor of a virtual machine 110. Thus, the mapping 602 may include at least as many processor identifiers as there are virtual processors 112a-n in the virtual machine 110. Each virtual processor can be configured to transmit a request to access the memory page 130 using its corresponding guest physical address. For example, virtual processor 112a can be configured to transmit a request to access the memory page 130 using the guest physical address 604a, virtual processor 112b can be configured to transmit a request to access the memory page 130 using the guest physical address 604b, virtual processor 112c can be configured to transmit a request to access the memory page 130 using the guest physical address 604c, and so on.

In block 704, the hypervisor 116 detects a request 126 to access the memory page 130. The request 126 may have been transmitted by a virtual processor 112a of the virtual machine 110. The request 126 can include a guest physical address 604a for the memory page 130, where the guest physical address 604a is specific to the virtual processor 112a that issued the request 126.

In some examples, the hypervisor 116 can detect the request 126 based on an entry in a page modification log 124. The entry can indicate the guest physical address 604a for the memory page 130. In other examples, the hypervisor 116 can detect the request 126 based on a notification from a physical processor, such as the physical processor 106a that added the entry into the page modification log 124. The notification can indicate the guest physical address 604a for the memory page 130. Other techniques may also be used to allow the hypervisor 116 to detect the request 126.

In block 706, the hypervisor 116 identifies a correlation, in the mapping 602, between the guest physical address 604a and a processor identifier. The processor identifier can correspond to the virtual processor 112a that issued the request 126. The correlation can indicate that the virtual processor 112a originated the request 126.

In block 708, the hypervisor 116 identifies a particular NUMA node that includes the virtual processor 112a. For example, the hypervisor 116 can use the mapping 402 to determine a correlation between the processor identifier and the particular NUMA node.

In block 710, the hypervisor 116 selects a destination NUMA node for the memory page (e.g., to which to migrate the memory page 130) based on the particular NUMA node that includes virtual processor 112a. For example, the hypervisor 116 can select whichever NUMA node is physically closest to the particular NUMA node as the destination NUMA node for the migration.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by a physical processor of a first non-uniform memory access (NUMA) node for causing the physical processor to:

detect a request from a virtual machine to access a memory page, wherein the virtual machine is supported by a hypervisor of the first NUMA node, and wherein the request is detected by the physical processor rather than the hypervisor; and in response to detecting the request, update a page modification log to include an entry indicating the request, wherein the hypervisor supporting the virtual machine is configured to:

monitor the page modification log over time to detect a change to the page modification log, wherein the change corresponds to the entry; and based on detecting the change in the page modification log:

access the entry in the page modification log to indirectly detect the request; and migrate the memory page from a second NUMA node to a destination NUMA node, the second NUMA node being separate from the first NUMA node.

2. The non-transitory computer-readable medium of claim 1, wherein the hypervisor is configured to migrate the memory page from the second NUMA node to the destination NUMA node by:

determining that the memory page exists at a source memory address on the second NUMA node;

copying the memory page from the source memory address to a destination memory address on the destination NUMA node, the destination NUMA node being different than the second NUMA node;

determining a guest physical address associated with the memory page, the guest physical address being an address of the memory page in a virtual memory of the virtual machine; and generating a page table entry, within a host page table of the hypervisor, that maps the guest physical address in the virtual memory to the destination memory address on the destination NUMA node.

3. The non-transitory computer-readable medium of claim 2, wherein the hypervisor is further configured to, prior to copying the memory page from the source memory address to the destination memory address:

select the destination NUMA node for storing the memory page based on a physical distance between the first NUMA node and the destination NUMA node.

4. The non-transitory computer-readable medium of claim 3, wherein the destination NUMA node is a third NUMA node, the third NUMA node being different from the first NUMA node and the second NUMA node, and the third NUMA node being physically located closer to the first NUMA node than the second NUMA node in a distributed NUMA node architecture.

5. The non-transitory computer-readable medium of claim 1, wherein the destination NUMA node is the first NUMA node.

6. The non-transitory computer-readable medium of claim 1, wherein the page modification log is maintained by the physical processor and stored in a physical memory of the first NUMA node.

7. The non-transitory computer-readable medium of claim 1, wherein the virtual machine includes a plurality of virtual processors that are executable on a plurality of physical processors of a plurality of NUMA nodes.

8. The non-transitory computer-readable medium of claim 7, wherein the entry includes a processor identifier, the processor identifier being a unique identifier of an originating processor of the request, and wherein the hypervisor is further configured to:

determine the processor identifier included in the entry;

access a mapping that correlates processor identifiers to NUMA node identifiers;

identify a correlation in the mapping between the processor identifier and a NUMA node identifier, wherein the NUMA node identifier corresponds to a particular NUMA node of the plurality of NUMA nodes, and wherein the correlation indicates that the particular NUMA node includes the originating processor; and select the destination NUMA node for the memory page based on the particular NUMA node.

9. The non-transitory computer-readable medium of claim 7, wherein a plurality of processor identifiers are configured to uniquely identify the plurality of virtual processors, and wherein the hypervisor is configured to:

generate a mapping that correlates the plurality of processor identifiers to a plurality of guest physical addresses (GPAs) associated with the memory page, wherein each virtual processor of the plurality of virtual processors is configured to request the memory page from a corresponding GPA of the plurality of GPAs; and subsequent to generating the mapping:

detect the request based on the entry in the page modification log, the entry including a guest physical address associated with the memory page;

determine the guest physical address included in the entry;

identify a correlation in the mapping between the guest physical address and a processor identifier, the correlation indicating that the request was issued by a virtual processor associated with the processor identifier;

identify a particular NUMA node, of the plurality of NUMA nodes, that includes the virtual processor; and select the destination NUMA node for the memory page based on the particular NUMA node.

10. The non-transitory computer-readable medium of claim 1, further comprising program code that is executable by the physical processor for causing the physical processor to update the page modification log to include the entry associated with the request, without triggering an exit of the virtual machine.

11. A method comprising:

detecting, by a physical processor of a first non-uniform memory access (NUMA) node, a request from a virtual machine to access a memory page, wherein the virtual machine is supported by a hypervisor of the first NUMA node, and wherein the request is detected by the physical processor rather than the hypervisor; and in response to detecting the request, updating, by the physical processor, a page modification log to include an entry indicating the request, wherein the hypervisor supporting the virtual machine is configured to:

monitor the page modification log over time to detect a change to the page modification log, wherein the change corresponds to the entry; and based on detecting the change in the page modification log:

access the entry in the page modification log to indirectly detect the request; and migrate the memory page from a second NUMA node to a destination NUMA node, the second NUMA node being separate from the first NUMA node.

12. The method of claim 11, wherein the hypervisor is configured to migrate the memory page from the second NUMA node to the destination NUMA node by:

determining that the memory page exists at a source memory address on the second NUMA node;

copying the memory page from the source memory address to a destination memory address on the destination NUMA node, the destination NUMA node being different than the second NUMA node;

determining a guest physical address associated with the memory page, the guest physical address being an address of the memory page in a virtual memory of the virtual machine; and generating a page table entry, within a host page table of the hypervisor, that maps the guest physical address in the virtual memory to the destination memory address on the destination NUMA node.

13. The method of claim 11, wherein the page modification log is maintained by the physical processor and stored in a physical memory of the first NUMA node.

14. The method of claim 11, wherein the virtual machine includes a plurality of virtual processors that are executing on a plurality of physical processors of a plurality of NUMA nodes.

15. The method of claim 14, wherein the entry includes a processor identifier, the processor identifier being a unique identifier of an originating processor of the request, and wherein the hypervisor is further configured to:

determine the processor identifier included in the entry;

access a mapping that correlates processor identifiers to NUMA node identifiers:

identify a correlation in the mapping between the processor identifier and a NUMA node identifier, wherein the NUMA node identifier corresponds to a particular NUMA node of the plurality of NUMA nodes, and wherein the correlation indicates that the particular NUMA node includes the originating processor; and select the destination NUMA node for the memory page based on the particular NUMA node.

16. The method of claim 14, wherein a plurality of processor identifiers are configured to uniquely identify the plurality of virtual processors, and wherein the hypervisor is configured to:

generate a mapping that correlates the plurality of processor identifiers to a plurality of guest physical addresses (GPAs) associated with the memory page, wherein each virtual processor of the plurality of virtual processors is configured to request the memory page from a corresponding GPA of the plurality of GPAs; and subsequent to generating the mapping:

detect the request based on the entry in the page modification log, the entry including a guest physical address associated with the memory page;

determine the guest physical address associated with the request;

identify a correlation in the mapping between the guest physical address and a processor identifier, the correlation indicating that the request was issued by a virtual processor associated with the processor identifier;

identify a particular NUMA node, of the plurality of NUMA nodes, that includes the virtual processor; and select the destination NUMA node for the memory page based on the particular NUMA node.

17. The method of claim 11, further comprising:

updating the page modification log to include the entry associated with the request, without triggering an exit of the virtual machine.

18. A system comprising:

a physical processor of a first NUMA node; and a physical memory of the first NUMA node, the physical memory including instructions that are executable by the physical processor for causing the physical processor to:

detect a request from a virtual machine to access a memory page, wherein the virtual machine is supported by a hypervisor of the first NUMA node, and wherein the request is detected by the physical processor rather than the hypervisor; and in response to detecting the request, update a page modification log to include an entry indicating the request, wherein the hypervisor supporting the virtual machine is configured to:

monitor the page modification log over time to detect a change to the page modification log, wherein the change corresponds to the entry; and based on detecting the change in the page modification log:

access the entry in the page modification log to indirectly detect the request; and migrate the memory page from a second NUMA node to a destination NUMA node, the second NUMA node being separate from the first NUMA node.

19. The system of claim 18, wherein the hypervisor is further configured to:

determine a processor identifier associated with the request, the processor identifier being a unique identifier of an originating processor of the request;

access a mapping that correlates processor identifiers to NUMA node identifiers;

identify a correlation in the mapping between the processor identifier and a NUMA node identifier, wherein the NUMA node identifier corresponds to a particular NUMA node of the system, and wherein the correlation indicates that the particular NUMA node includes the originating processor; and select the destination NUMA node for the memory page based on the particular NUMA node.

20. The system of claim 18, wherein the virtual machine includes a plurality of virtual processors, wherein a plurality of processor identifiers are configured to uniquely identify the plurality of virtual processors, and wherein the hypervisor is configured to:

generate a mapping that correlates the plurality of processor identifiers to a plurality of guest physical addresses (GPAs) associated with the memory page, wherein each virtual processor of the plurality of virtual processors is configured to request the memory page from a corresponding GPA of the plurality of GPAs; and subsequent to generating the mapping:

detect the request;

determine a guest physical address associated with the request;

identify a correlation in the mapping between the guest physical address and a processor identifier, the correlation indicating that the request was issued by a virtual processor associated with the processor identifier;

identify a particular NUMA node that includes the virtual processor; and select the destination NUMA node for the memory page based on the particular NUMA node.

\* \* \* \* \*